Oct. 25, 1932.  E. A. RUSSELL  1,884,268
VAPOR REGULATOR
Filed Oct. 9, 1931  5 Sheets-Sheet 1
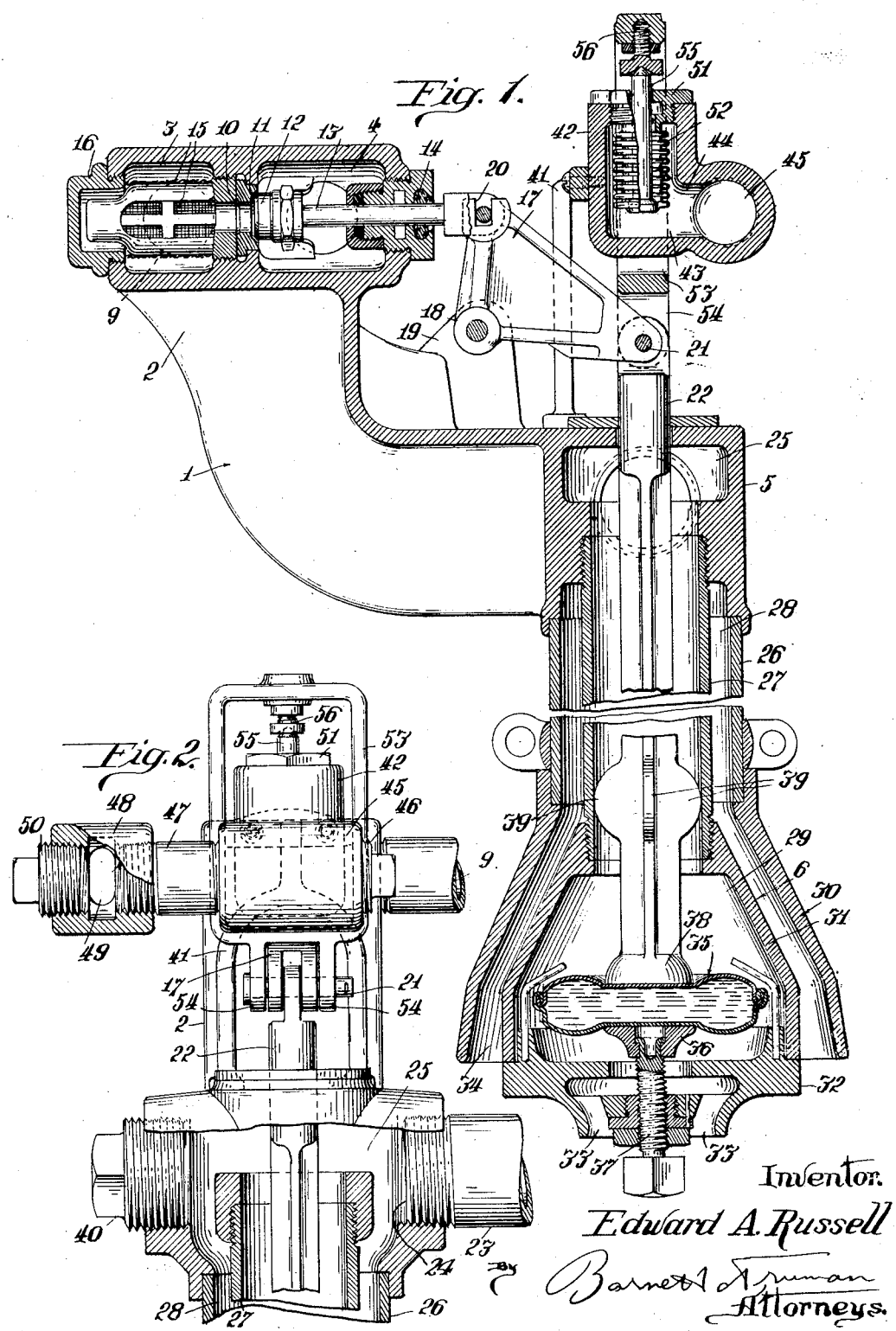
Inventor.
Edward A. Russell

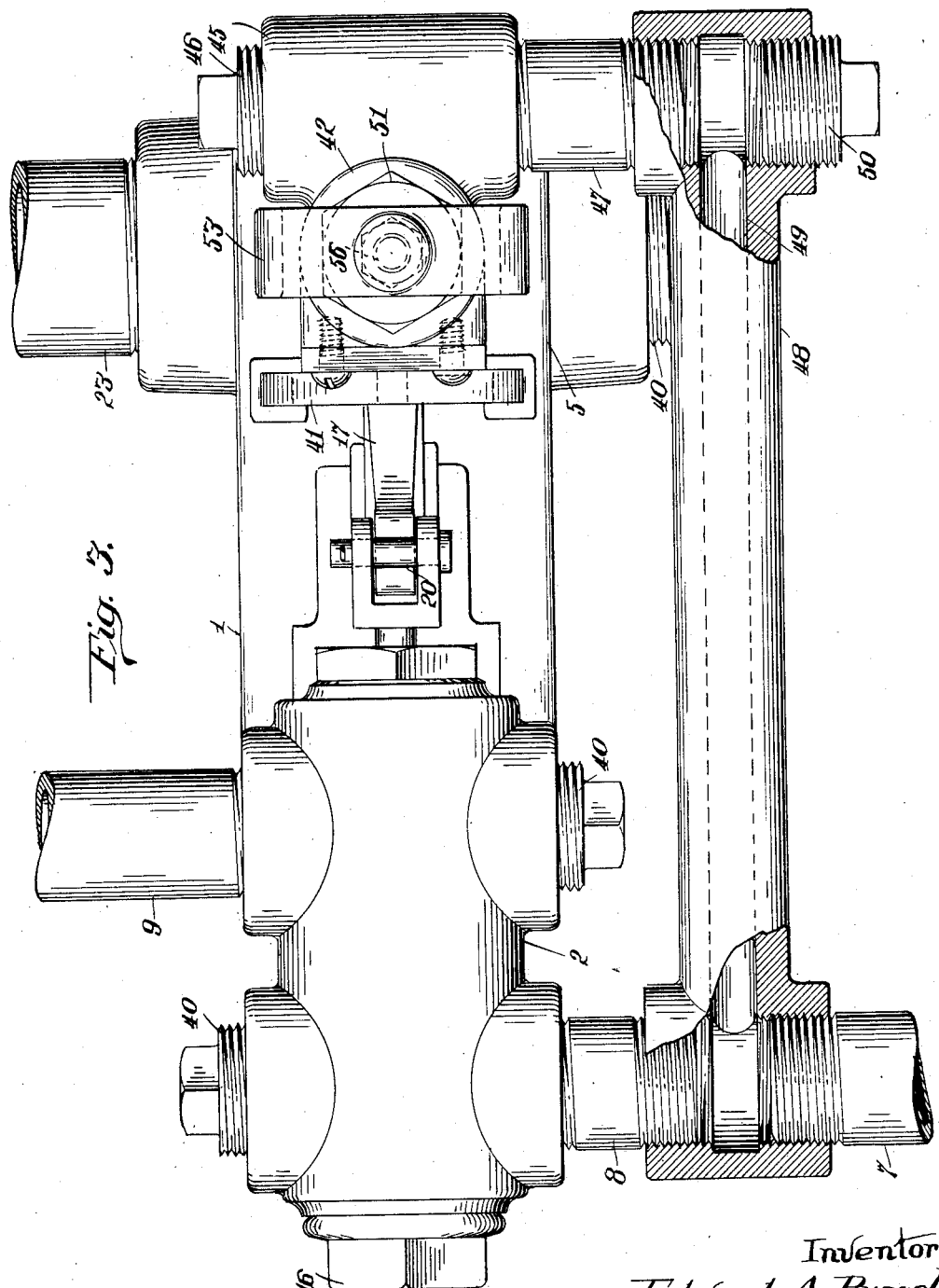

Oct. 25, 1932.  E. A. RUSSELL  1,884,268
VAPOR REGULATOR
Filed Oct. 9, 1931   5 Sheets-Sheet 3

Inventor
Edward A. Russell
By Barrett & Truman
Attorneys

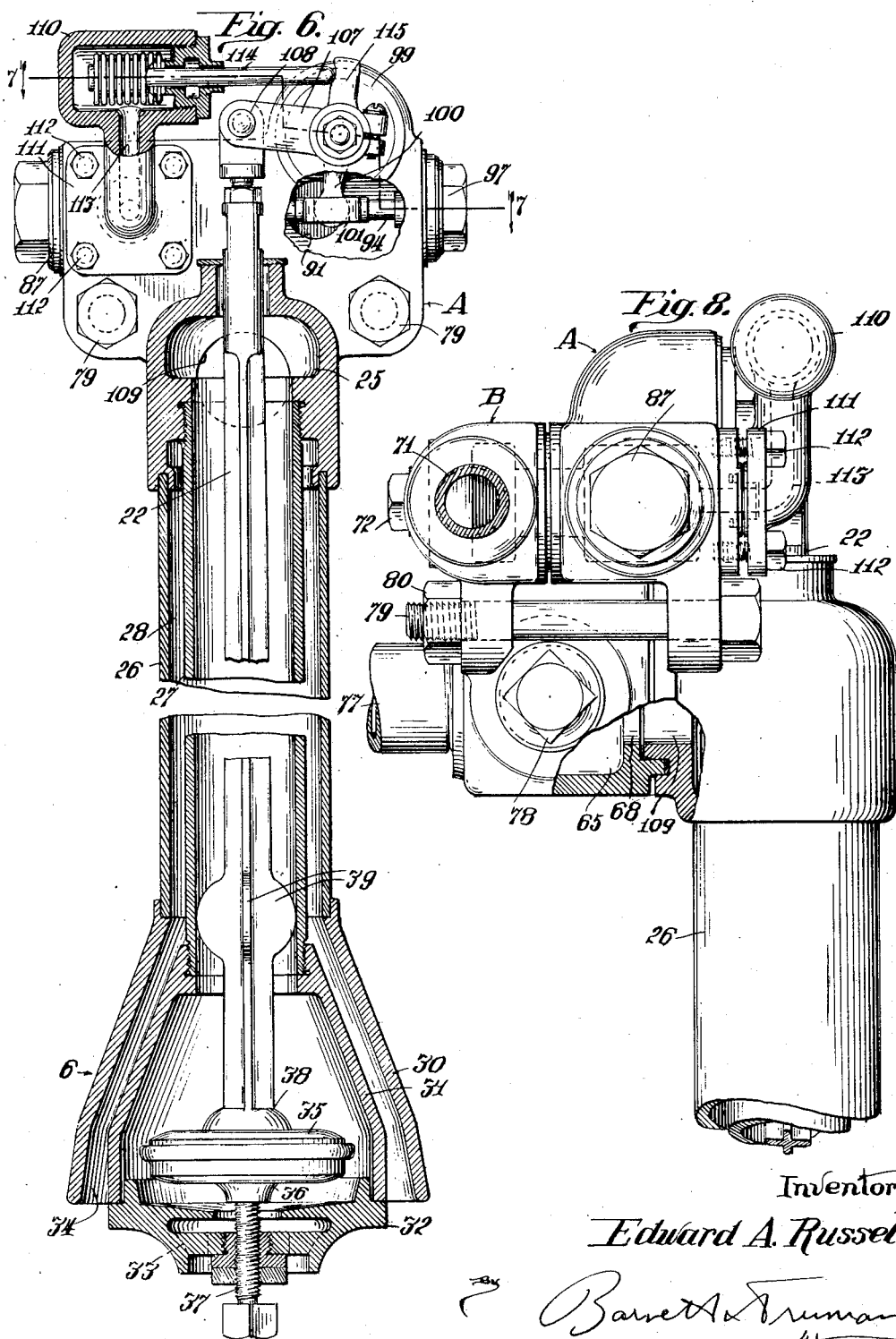

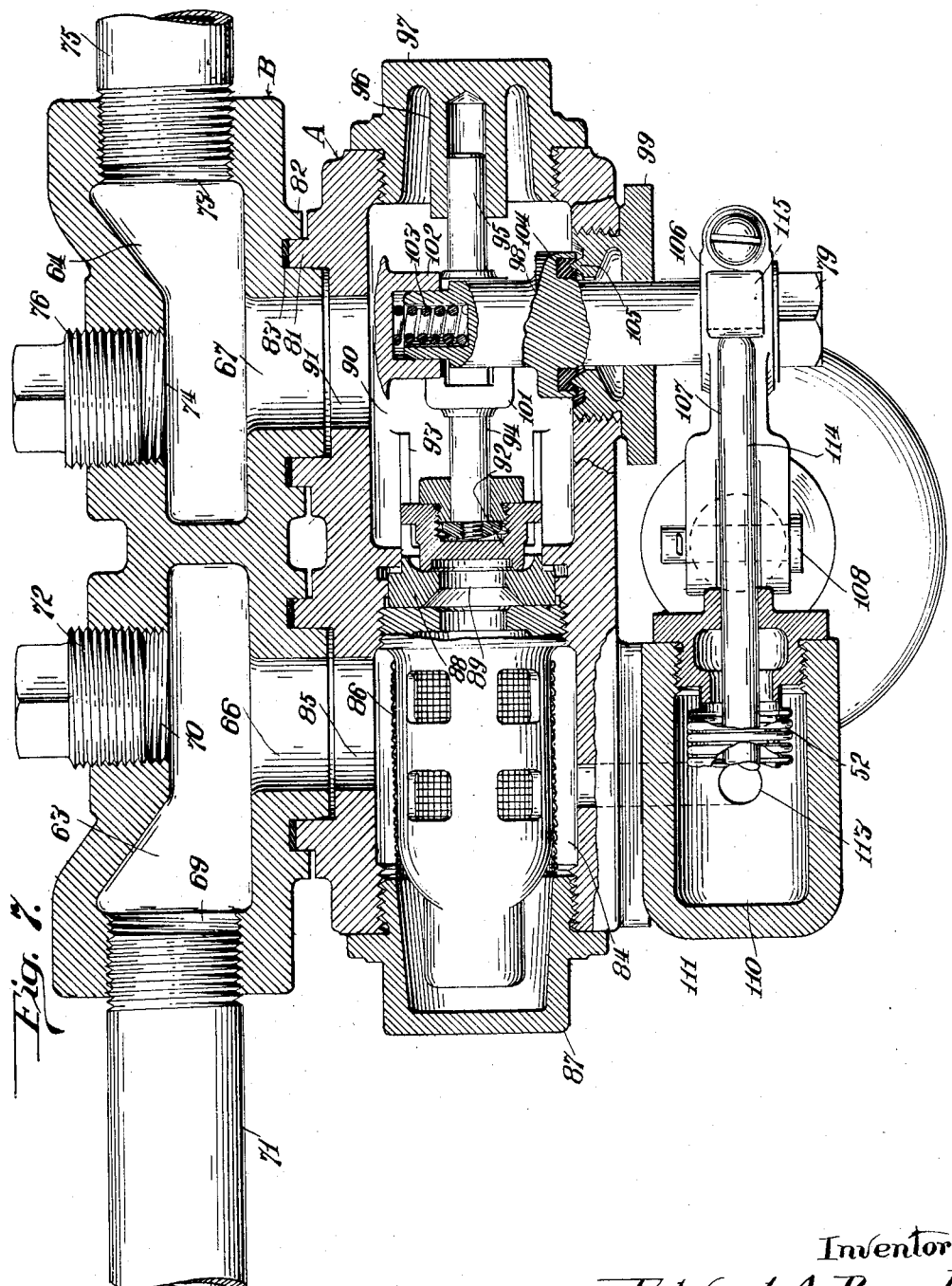

Patented Oct. 25, 1932

1,884,268

UNITED STATES PATENT OFFICE

EDWARD A. RUSSELL, OF CHICAGO, ILLINOIS, ASSIGNOR TO VAPOR CAR HEATING COMPANY, INC., OF CHICAGO, ILLINOIS, A CORPORATION OF NEW YORK

VAPOR REGULATOR

Application filed October 9, 1931. Serial No. 567,891.

This invention relates to certain new and useful improvements in a vapor regulator of the type used in steam or vapor heating systems for railway cars. Such a regulator is used for controlling the supply of steam to the radiators of the car heating system. The regulator embodies a thermostatically operated valve past which the steam must flow from the train pipe or other source of supply to the radiating system. The valve is controlled by a thermostatic element housed in a chamber to which steam flows back from the radiators when the radiators are completely filled with steam. The expansion of this thermostatic element closes the valve to cut off further flow of steam to the radiators.

A regulator of the particular type with which the present improvements are concerned comprises a relatively high pressure chamber into which the steam flows from the source of supply and a relatively low pressure chamber from which the steam flows to the radiators. Since the low pressure chamber is in open communication with the radiators which are operated at substantially atmospheric pressure, the steam in the low pressure chamber will normally be at substantially atmospheric pressure. The movable valve member for closing the passage between the chambers is positioned in the low pressure chamber and closes against the higher pressure existing in the high pressure chamber. Consequently there will normally be a pressure differential acting on the movable valve member and tending to move it to open position, and this pressure differential must be overcome by the thermostatic element which closes the valve when the system is filled with steam. Since the pressure of the steam in the train pipe or other source of supply may vary, this pressure differential is not constant, and it is difficult to properly adjust the thermostatic element which closes the valve, and a thermostatic element of considerable power must be provided to overcome the maximum pressure differential which may be exerted on the valve.

According to the present invention an auxiliary compensating means is provided whereby the forces required for moving the valve toward or from closed position will be substantially constant, regardless of possible variations in the pressure of the steam supply. More specifically, a compensating pressure motor is provided which is operated by the high pressure steam and tends to constantly move the valve toward closed position, thus constantly balancing a portion of the force which tends to open the valve. In this way, there is a small and substantially constant pressure differential tending to move the valve to open position and this relatively small and constant force is all that need be overcome by the thermostatic element in order to close the valve.

The general object of this invention is to provide an improved vapor regulator of the type briefly described hereinabove and disclosed more in detail in the specifications which follow.

Another object is to provide an improved vapor regulator which may be provided with a substantially permanent adjustment for use with a variety of steam pressures.

Another object is to provide means for exerting a substantially constant pressure differential on a movable valve member.

Another object is to provide an auxiliary compensating motor for assisting in closing the movable valve member of a vapor regulator.

Another object is to provide an improved pressure compensating device which may be attached to vapor regulators of known type and now in common usage.

Other objects and advantages of this invention will be more apparent from the following detailed description of certain approved forms of apparatus embodying the principles of this invention.

In the accompanying drawings:

Fig. 1 is a vertical section through a vapor regulator of known type with the pressure compensating mechanism applied thereto.

Fig. 2 is a side elevation, partially in section, looking from the right at the upper portion of Fig. 1.

Fig. 3 is a plan view, on a larger scale, of the structure shown in Figs. 1 and 2.

Fig. 6 is a partial side elevation and partial vertical section of still another form of vapor regulator to which these improvements have been applied.

Fig. 7 is a horizontal section, on a larger scale, taken substantially on the line 7—7 of Fig. 6.

Fig. 8 is a partial side elevation, looking from the left at the structure shown in Figs. 6 and 7.

Figure 4:
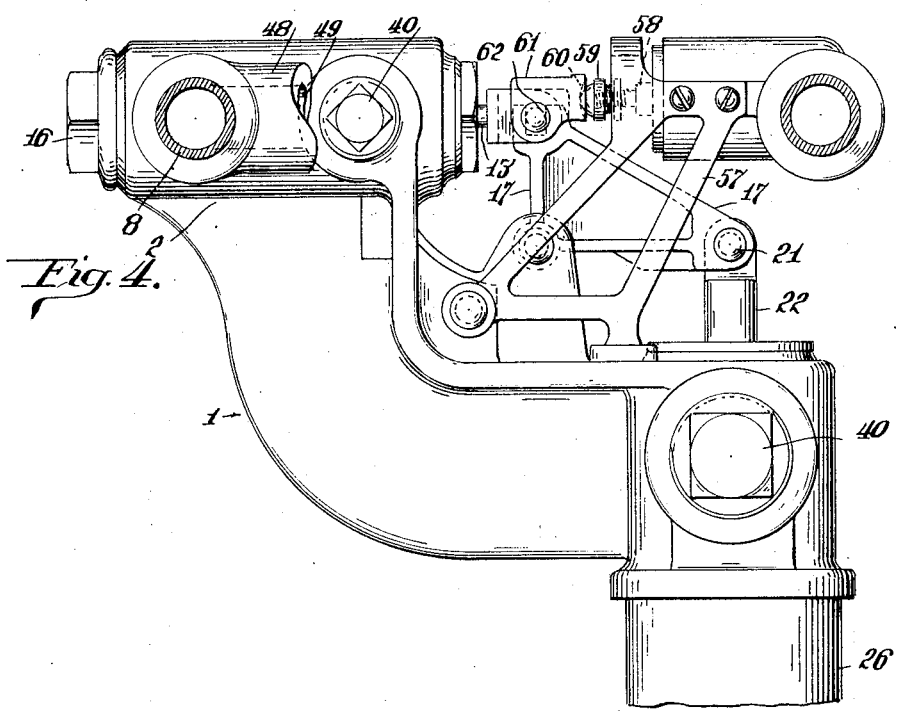
Fig. 4 is an elevation, partially broken away, of a modified form of the invention.

Referring first to Figs. 1, 2 and 3, the main frame or casting 1 may be supported in any suitable manner beneath the car or may be carried by the connecting pipes hereinafter described. This casting comprises an upwardly extending arm 2 in which the high pressure chamber 3 and low pressure chamber 4 are formed, and a horizontally projecting arm 5 from which the thermostat assembly indicated generally at 6 is supported. The steam supply pipe 7 (see Fig. 3) leads from the train pipe or other source of supply through pipe coupling 8 into the high pressure chamber 3, and the pipe 9 leads from the low pressure chamber 4 to the radiators, or intermediately to the supply valve for the radiators. The steam passage 10 leading from high pressure chamber 3 into low pressure chamber 4 has a valve seat 11 at its outlet end which may be closed by the movable valve member 12 housed and guided within the low pressure or outlet chamber 4 and moved to open or closed positions by means of the valve stem 13 which projects out through a packing 14 provided in one end of the low pressure chamber. A strainer 15 within the high pressure chamber 3 is held in place by a closure plug 16.

A rocker arm or bell crank lever 17 is pivoted at 18 on a fixed bracket 19 formed on frame 1, and one arm of this rocker member has a pin and slot connection at 20 with the outer end of valve stem 13. The other arm of the rocker member has a pivotal connection at 21 with an operating rod 22 which projects down into and through the thermostat housing, hereinafter described.

A return pipe 23 leading back from the radiators within the car is connected into an inlet port 24 leading into chamber 25 formed in the arm 5 of casting 1. An outer tube 26 and an inner tube 27 are respectively secured at their upper ends to the arm 5 and lead downwardly from chamber 25. The condensate flowing in from the heating system through port 23 drains down through the annular space 28 formed between the inner and outer tubes 26 and 27. The greater portion of the returned steam or hot gases flows down through the inner tube 27 into the thermostat-housing or return chamber 29.

The lower ends of the tubes 26 and 27 are connected with a lower bell-shaped casting, indicated generally at 30. This casting comprises an inner housing 31 which encloses the return chamber 29, and which is closed at its lower end by a removable closure member 32. The chamber 29 is closed except for the inlet in its top leading through tube 27, and a central lower outlet indicated generally at 33 in the closure plate 32, through which condensate may drain out. The annular space 28 between the inner and outer tubes connects with drain passages 34 formed outside of the housing 31.

The thermostatic element 35 is in the form of a closed hollow flexible disc which is filled or partially filled with a suitable heat-responsive fluid. When this disc is subjected to a certain temperature, the fluid will vaporize or expand, thereby expanding the disc 35. When the surrounding temperature is lowered, the disc will again contract. The element 35 is supported on a head 36 carried at the upper end of an adjusting screw 37 mounted in the closure plate 32. A head 38 at the lower end of operating rod 22 rests on the upper surface of disc 35. The rod 22 is preferably provided with guide lugs 39 for centering it within the inner tube 27 without materially impeding the flow of fluids through the tube.

It might here be noted that similar ports are formed in diametrically opposite sides of the chambers 3, 4 and 25 for receiving the respective pipes 8, 9 and 23, the ports not used being closed by suitable screw plugs 40. In this way, the connecting pipes may be attached in the most convenient manner, according to the particular positioning of the regulator relative to the piping.

A vapor regulator, such as hereinabove briefly described, is substantially well known in the art. When the thermostatic element 35 is in the collapsed condition shown in the drawings, the valve 12 will be opened by the higher pressure existing in chamber 3 and steam will flow from the supply chamber 3 into the low pressure chamber 4 and thence through pipe 9 to the radiators of the heating system. When the system has become filled with steam or vapor, the excess steam or hot gases will flow through the return pipe 23, chamber 25 and pipe 27 into the return chamber or thermostat housing 29 and will raise the temperature of the thermostatic disc 35 so that this disc will expand, lifting the operating rod 22, and through rocker arm 17 and valve stem 13, moving the valve 12 against its seat 11 so as to cut off the further flow of steam or vapor to the radiators. Condensate from the radiators will drain down through annular space 28 and outlets 34. Any condensate and excess gases from chamber 29 will drain out through outlets 33. As steam or vapor ceases to flow into the chamber 29 and the temperature of the gases in this chamber become lowered, the disc 35 will contract and the valve 12 will again open, due to the higher pressure in chamber 3, and a further supply of steam will flow to the radiators. It will be apparent that there is a pressure differential acting on the valve 12 tending to open this valve, due to the relatively high pressure steam in chamber 3 acting on one face of the valve, and the low pressure steam (normally at substantially atmospheric pressure) in chamber 4 acting on the other face of the valve. It will also be apparent that the force exerted by the expanding thermostatic disc 35 must oppose and overcome this pressure differential in order to move the valve 12 to closed position and hold it in this position. Under normal operating conditions, substantially atmospheric pressure will always exist in the low pressure chamber 4, but since the pressure of the steam received from the steam supply may vary, the high pressure in chamber 3 will vary and consequently the pressure differential exerted on valve 12 will not be constant, so that the thermostatic disc 35 must sometimes overcome different or varying pressures, thus requiring adjustment of the thermostatic member and operating connections. Furthermore, a regulator of any substantially fixed size or adjustment is only adapted for operating with steam pressures varying within small limits.

According to the present invention, a compensating motor is provided for exerting a pressure differential in opposition to the pressure differential exerted on valve 12, as hereinabove described, these two pressure differentials varying simultaneously so that only a smaller and substantially constant pressure is opposed to the force exerted by the expansible thermostatic disc 35. In the form shown in Figs. 1, 2 and 3, a standard or bracket 41 mounted on the arm 5 of casting 1, carries at its upper end, a motor cylinder 42 in which is a motor chamber or steam chamber 43 communicating adjacent its lower end through port 44 with a horizontally disposed cylinder 45 having threaded openings in its opposite ends. One of these openings will be closed by a plug 46 and the other receives the pipe connection 47. An adapter conduit 48 is formed with an internal passage 49, the opposite ends of which are provided with similar internally threaded openings in the two sides thereof. At one end of adapter 48, the supply pipe 7 connects into one of these openings and the pipe connection 8 leading to high pressure chamber 3 connects into the other opening. At the opposite end of the adapter 48, the pipe connection 47 leads into one of the side openings and the other opening is closed by a plug 50. It will now be apparent that by reason of these conduit connections motor cylinder 43 will always be filled with steam at the pressure existing in high pressure chamber 3.

The upper end of cylinder 42 is closed by an annular plug 51, from which depends a closed flexible housing or diaphragm 52 formed with corrugated side walls. This diaphragm member is closed at its lower end, and is consequently subject internally to atmospheric pressure and externally to the steam pressure existing in motor chamber 43. This flexible diaphragm 52 forms an expansible or movable portion of the enclosing wall of motor chamber 43. A yoke 53 which surrounds the motor cylinder 42 is formed at its lower end with hinge lugs 54 which straddle the end of rocker arm 17 and upper end of operating rod 22, these members all being pivotally connected by the pivot pin 21. A pressure rod or pin 55 rests at its lower end within the closed bottom end of flexible diaphragm 52 and bears at its upper end against an adjusting screw 56 mounted in the upper cross-bar of yoke 53.

It will now be seen that there will be a constant pressure differential exerted upwardly on the flexible diaphragm 52, due to the super-atmospheric pressure existing in chamber 43, and the force of this pressure differential will be exerted through yoke 53 and rocker arm 17 to tend to move valve 12 to closed position. As the pressures of the high pressure steam in chambers 3 and 43 vary simultaneously, the pressure differentials exerted on valve 12 and diaphragm 52 will also increase or diminish simultaneously and in the same proportion. Preferably the flexible diaphragm 52 will be so proportioned relative to the area of valve 12 that the opposing force exerted by this compensating motor on the low-pressure side of valve 12 will be about 80% of the force exerted on the high pressure side of the valve. In other words, this compensating motor will balance approximately 80% of the pressure differential normally tending to open valve 12 so that the force to be overcome by the thermostatic disc 35 will only be 20% of the force otherwise required. Furthermore, this diminished resistance to the operation of the valve will be substantially constant regardless of variations in the pressure of the steam received from the steam supply.

It will also be apparent that the same pressure regulator, when once properly and permanently adjusted, may be used in different installations utilizing steam at a variety of pressures, since no matter what the pressure of the inlet steam may be, the force opposed to the operation of thermostatic disc 35 will be constant.

Figure 5:
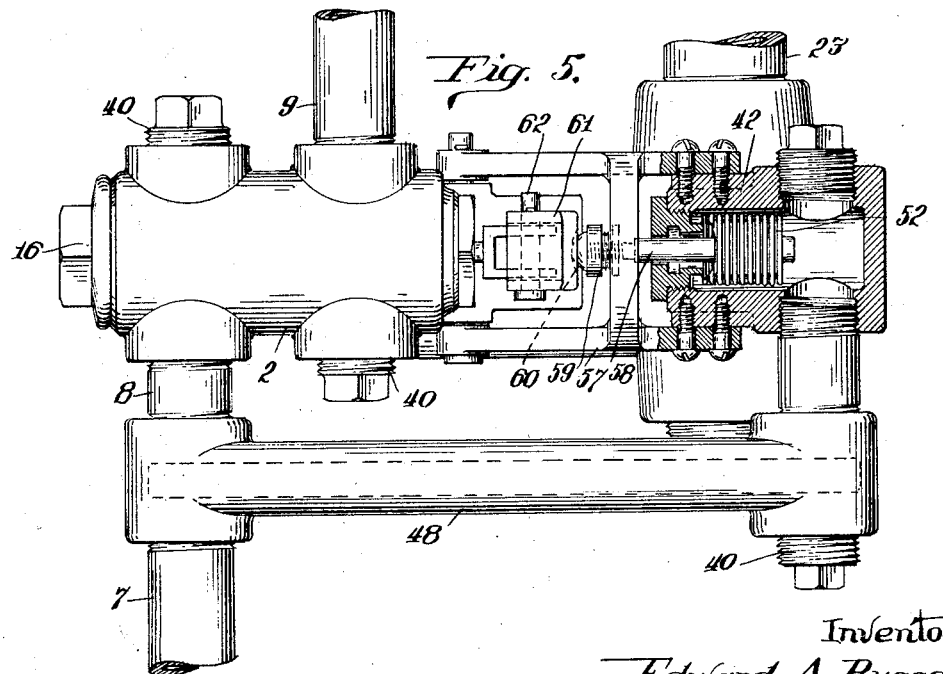
Fig. 5 is a plan view, partially in section, of the structure shown in Fig. 4.

A somewhat simpler means of mounting the compensating motor and connecting it with the regulator is shown in Figs. 4 and 5. Parts similar to those already described are indicated by the same reference characters.

In this form, the motor cylinder 42 is mounted horizontally, instead of vertically, and is carried by a supporting bracket 57 mounted in any suitable manner on the casting 1. The operating rod or stem 58 which projects out from the flexible diaphragm 52 is threaded into an adjustable rounded head 59 which engages a seat 60 formed in a yoke or clevis 61 which straddles the connected ends of rocker arm 17 and valve stem 13 and is connected thereto by pivot pin 62. As in the first described form of the invention, this compensating motor acts through the rocker arm and valve stem to tend to move the valve to closed position.

In the modification shown in Figs. 6, 7 and 8, the invention is applied to a somewhat different form of vapor regulator having a head A adapted to be removably attached to a fixed supporting member B, whereby all of the piping connections leading to and from the source of steam supply and the radiating system may be simultaneously connected or disconnected. This form of vapor regulator and its supporting means is disclosed and claimed in the copending application of Russell, Serial No. 527,456, filed April 3, 1931. The supporting member B is formed with three separate chambers; an inlet chamber 63, an outlet chamber 64 and a return chamber 65, formed in one face thereof with the respective ports 66, 67 and 68, whereby connection is made with the high pressure, low pressure and return chambers, respectively, of the vapor regulator, as hereinafter described. The inlet chamber 63 is formed with threaded openings 69 and 70 in one end and the rear thereof, respectively, into one of which the steam supply pipe 71 is connected, the other opening being closed by a screw plug 72. In a similar manner, the outlet chamber 64 is provided with threaded openings 73 and 74, into one of which is connected the pipe 75 leading to the radiating system, the other opening being closed by screw plug 76. The return chamber 65 is provided with three similar threaded openings in the two sides and the rear thereof, the return pipe 77 leading back from the radiating system being connected into one of the openings and the other openings being closed by screw plugs 78. By means of this plurality of openings, the connecting pipes may be led into the supporting member B from the most desirable direction. The head A of the vapor regulator is provided with ports in one side thereof adapted to register respectively with the three ports 66, 67 and 68 in the supporting member B, the head A and supporting member B being removably clamped together by means of suitable bolts 79 and nuts 80. By simply removing these bolts, the entire vapor regulator may be removed as a unit without disturbing any of the piping connections leading to the supporting member B. Overlapping annular flanges 81 and 82 and interposed gaskets 83 serve to seal the connections between the members A and B. The high pressure chamber 84 of the vapor regulator communicates through port 85 with the inlet port 66 leading from supporting member B. In this chamber is strainer 86 held in place by a closure plug 87. The annular valve seat 88 surrounds the steam passage 89 leading to the low pressure chamber 90 having port 91 communicating with port 67 leading through the outlet chamber of the supporting member B. The movable valve member 92 travels between guides 93 and is carried at one end of valve stem 94, the other end 95 of which is slidable in a bearing 96 formed in the closure plug 97 threaded into the opposite end of the low pressure chamber. A rock shaft 98 is rotatably journaled in a plug 99 threaded into one side of the chamber 90, and has a depending crank arm 100 engaging in the slot of a yoke 101 formed intermediate the length of valve stem 94. The inner end of rock shaft 98 is journaled in a bearing 102 formed interiorly of the chamber, and a spring 103 urges the rock shaft outwardly so as to force an annular gasket or sealing ring 104 against a flange 105 formed on closure port 99. On the outer end of rock shaft 98, outside the low pressure chamber, is fixed a rocker member 106 having one arm 107 pivotally connected at 108 to the upper end of the operating rod 22, which projects down to the thermostatic disc 35. This thermostatic operating mechanism and the enclosing housing therefor, may be the same as in the forms of the invention first disclosed, and need not be further described here. The port 109 leads from return chamber 65 of the supporting member B to the return chambers of the vapor regulator.

The cylinder 110 of the compensating motor is carried by an integral attaching plate 111, bolted at 112, to the head A of the regulator and formed with an internal passage 113 leading into the high pressure chamber 84. The internal construction of the compensating motor, including the flexible diaphragm 52, may be the same as in the forms first described. The operating rod 114 projecting out from the compensating motor bears at its outer end against a second arm 115 formed on the rocker arm 106, as best shown in Fig. 6. It will be noted that the compensating motor acts through the rocker arm 106 to tend to move the valve 92 to closed position, as in the first described forms of the invention.

If the vapor regulator is of the new type shown in Figs. 6, 7 and 8, it is desirable to form the compensating motor as a substantially integral portion of the assembly, as just described. It will be noted, however, that in the forms shown in Figs. 1 to 5 inclusive, the compensating motor and the adapter conduit 48 are so formed that they may be attached to vapor regulators already in service, thus securing the advantages of this invention without necessitating the rebuilding of, or any material changes in the structure of, vapor regulators of the type heretofore used.

I claim:

1. A vapor regulator for railway car heating systems comprising a casing having a relatively high pressure inlet chamber, a relatively low pressure outlet chamber and a return chamber, an expansible thermostatic element located in the return chamber, there being a passage between the inlet and outlet chambers, a valve in the low pressure chamber adapted to be moved to close the passage, a valve stem in the low pressure chamber for moving the valve to or from closed position, a compensating motor comprising a closed chamber, an expansible diaphragm forming one wall of the chamber, a conduit connecting the motor chamber with the high pressure chamber, a rockarm positioned outside the chambers and connected with the valve stem; operating means connecting the diaphragm of the motor with the rockarm, and operating means connecting the thermostatic element with the rockarm.

2. A vapor regulator for railway car heating systems comprising a casing having a relatively high pressure inlet chamber, a relatively low pressure outlet chamber and a return chamber, there being a passage between the inlet and outlet chambers, a valve in the low pressure chamber adapted to be moved to close the passage, a valve stem projecting from the valve outside the low pressure chamber for moving the valve to or from closed position, an operating rod projecting from the thermostatic member outside the return chamber, a rockarm operatively connecting the rod and stem, a compensating pressure motor positioned outside said first mentioned chambers and comprising a closed motor chamber, an expansible diaphragm forming one wall of this motor chamber, a conduit connecting the motor chamber with the high pressure chamber, and operating connections between the motor diaphragm and the rockarm whereby the motor tends to balance a portion of the pressure-differential exerted on opposite sides of the valve.

3. A vapor regulator for railway car heating systems comprising a casing having a relatively high pressure inlet chamber, a relatively low pressure outlet chamber and a return chamber, there being a passage between the inlet and outlet chambers, a valve in the low pressure chamber adapted to be moved to close the passage, a valve stem in the low pressure chamber connected with the valve for moving it to open or closed positions, an operating rod projecting from the thermostatic element outside the return chamber, a rockarm positioned outside the chambers, means connecting the rockarm with the valve stem and with the rod, a compensating pressure mtor positioned outside the chambers and comprising a closed motor chamber, an expansible diaphragm forming one wall of the motor chamber, a conduit connecting the high pressure chamber with the motor chamber, and operating connections between the diaphragm and the rockarm.

4. The combination with a vapor regulator comprising a supporting casing formed with a high pressure inlet chamber, a low pressure outlet chamber and a return chamber, there being a passage between the high and low pressure chambers, a valve controlling this passage, a valve stem projecting outside the casing for moving the valve, a thermostatic member in the return chamber, an operating rod projecting from the thermostatic member outside the casing, and a rocker member mounted on the casing and operatively connecting the rod with the valve stem, of a compensating motor comprising a closed cylinder, a bracket for supporting the cylinder from the casing, a flexible diaphragm mounted within the cylinder and forming a portion of the enclosing wall of the cylinder, an operating member connecting the diaphragm with the rocker member, and a conduit connecting the motor cylinder with the high pressure chamber.

5. The combination with a vapor regulator comprising a supporting casing formed with a high pressure inlet chamber, a low pressure outlet chamber and a return chamber, there being a passage between the high and low pressure chambers, a valve controlling this passage, a valve stem projecting outside the casing for moving the valve, a thermostatic member in the return chamber, an operating rod projecting from the thermostatic member outside the casing, and a rocker member mounted on the casing and operatively connecting the rod with the valve stem, of a compensating motor comprising a closed cylinder, a bracket for supporting the cylinder from the casing, a flexible diaphragm mounted within the cylinder and forming a portion of the enclosing wall of the cylinder, an operating member connecting the diaphragm with the rocker member, a steam supply conduit leading to the high pressure chamber, and an adapter conduit connected into this supply conduit and having a branch leading to the motor cylinder.

6. The combination with a vapor regulator comprising a supporting casing formed with a high pressure inlet chamber, a low pressure outlet chamber and a return chamber, there being a passage between the high and low pressure chambers, a valve controlling this passage, a valve stem projecting outside the casing for moving the valve, a thermostatic member in the return chamber, an operating rod projecting from the thermostatic member outside the casing, and a means mounted on the casing and operatively connecting the rod with the valve stem, of a compensating motor comprising a closed cylinder, a bracket for supporting the cylinder from the casing, a flexible diaphragm mounted within the cylinder and forming a portion of the enclosing wall of the cylinder, an operating member connecting the diaphragm with the means connecting the rod and stem, and a conduit connecting the motor cylinder with the high pressure chamber.

7. The combination with a vapor regulator comprising a supporting casing formed with a high pressure inlet chamber, a low pressure outlet chamber and a return chamber, there being a passage between the high and low pressure chambers, a valve controlling this passage, a valve stem projecting outside the casing for moving the valve, a thermostatic member in the return chamber, an operating rod projecting from the thermostatic member outside the casing, and a means mounted on the casing and operatively connecting the rod with the valve stem, of a compensating motor comprising a closed cylinder, a bracket for supporting the cylinder from the casing, a flexible diaphragm mounted within the cylinder and forming a portion of the enclosing wall of the cylinder, an operating member connecting the diaphragm with the means connecting the rod and stem, a steam supply conduit leading to the high pressure chamber, and an adapter conduit connected into this supply conduit and having a branch leading to the motor cylinder.

8. The combination with a vapor regulator comprising a supporting casing formed with a high pressure inlet chamber, a low pressure outlet chamber and a return chamber, there being a passage between the high and low pressure chambers, a valve controlling this passage, a valve stem for moving the valve, a thermostatic member in the return chamber, an operating rod projecting from the thermostatic member, and operating connections between the rod and stem comprising a member positioned outside of the casing, of a compensating motor comprising a closed cylinder, means for supporting the cylinder from the casing exteriorly thereof, a flexible diaphram mounted within the cylinder and forming a portion of the enclosing wall of the cylinder, operating means connecting the diaphragm with the member of the operating connections positioned outside the casing, and a conduit connecting the motor cylinder with the high pressure chamber.

9. The combination with a vapor regulator comprising a supporting casing formed with a high pressure inlet chamber, a low pressure outlet chamber and a return chamber, there being a passage between the high and low pressure chambers, a valve controlling this passage, a valve stem for moving the valve, a thermostatic member in the return chamber, an operating rod projecting from the thermostatic member, and operating connections between the rod and stem comprising a member positioned outside of the casing, of a compensating motor comprising a closed cylinder, means for supporting the cylinder from the casing exteriorly thereof, a flexible diaphragm mounted within the cylinder and forming a portion of the enclosing wall of the cylinder, operating means connecting the diaphragm with the member of the operating connections positioned outside the casing, a steam supply conduit leading to the high pressure chamber, and an adapter conduit connected into this supply conduit and having a branch leading to the motor cylinder.

EDWARD A. RUSSELL.